United States Patent [19]

Larson et al.

[11] 4,330,368

[45] May 18, 1982

[54] CABLE HANDLING SYSTEM FOR USE IN A NUCLEAR REACTOR

[75] Inventors: Elmer M. Larson, Woodland Hills; Edward Moody, Simi; Robert O. Crosgrove, Chatsworth, all of Calif.

[73] Assignee: Electric Power Research Institute, Inc., Palo Alto, Calif.

[21] Appl. No.: 13,420

[22] Filed: Feb. 21, 1979

[51] Int. Cl.³ .............................................. G21C 19/20
[52] U.S. Cl. .................................. 376/460; 212/133; 414/146; 248/51
[58] Field of Search ....................... 176/27, 30, 33, 87; 414/146; 294/86 A; 212/73, 133, 142; 60/905; 248/51, 61

[56] References Cited

U.S. PATENT DOCUMENTS 3,836,430 9/1974 Frisch .................................. 176/30
4,113,558 9/1978 Wade .................................. 176/30

Primary Examiner—Donald P. Walsh
Attorney, Agent, or Firm—Flehr, Hohbach, Test

[57] ABSTRACT

A cable handling system for use in an installation such as a nuclear reactor is disclosed herein along with relevant portions of the reactor which, in a preferred embodiment, is a liquid metal fast breeder reactor. The cable handling system provides a specific way of interconnecting certain internal reactor components with certain external components, through an assembly of rotatable plugs. Moreover, this is done without having to disconnect these components from one another during rotation of the plugs and yet without interfering with other reactor components in the vicinity of the rotating plugs and cable handling system.

9 Claims, 8 Drawing Figures

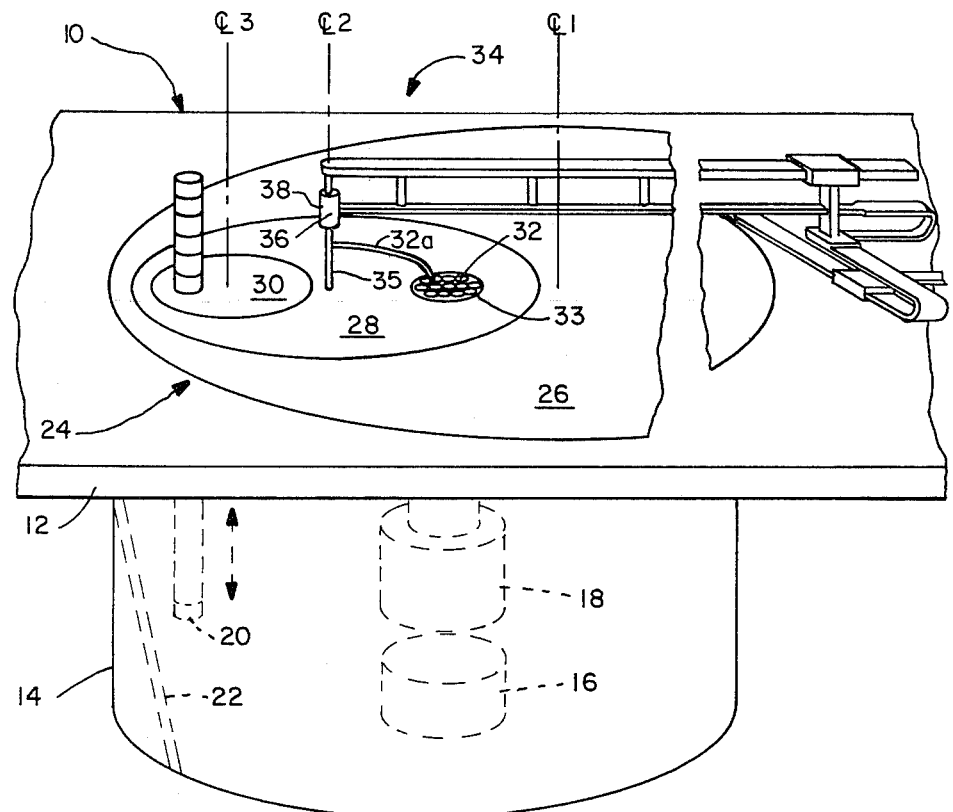
FIG.—1
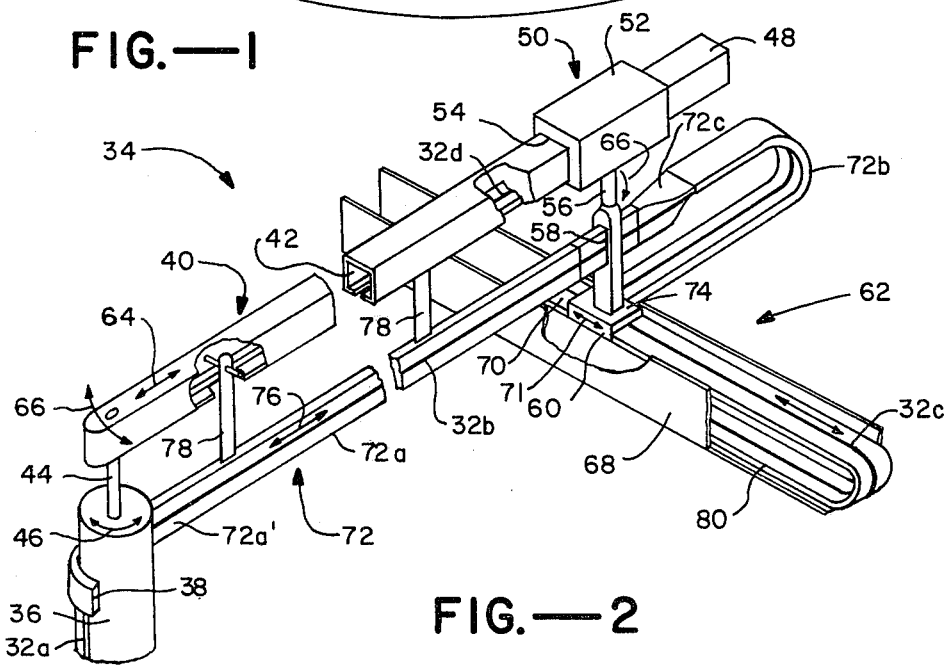
FIG.—2

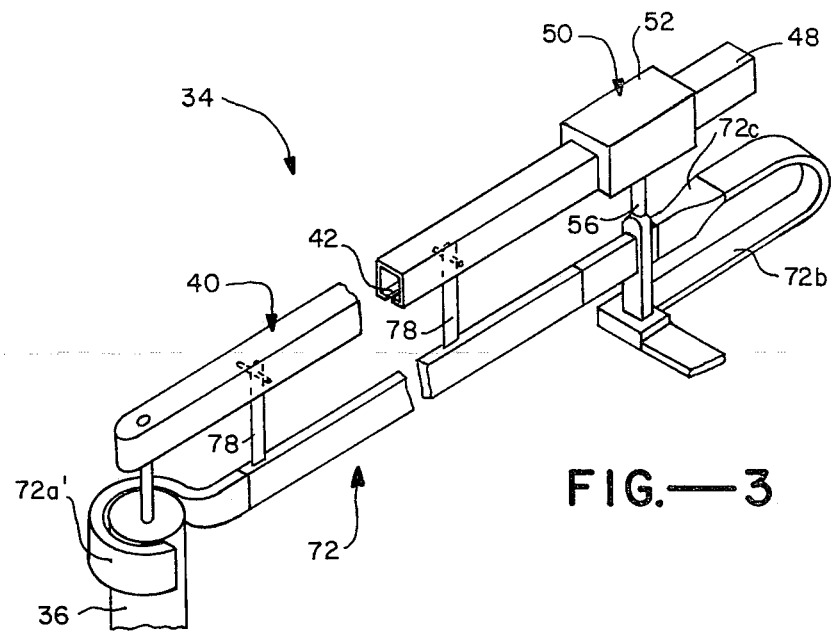
FIG.—3
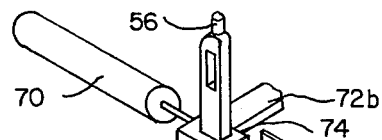
FIG.—4
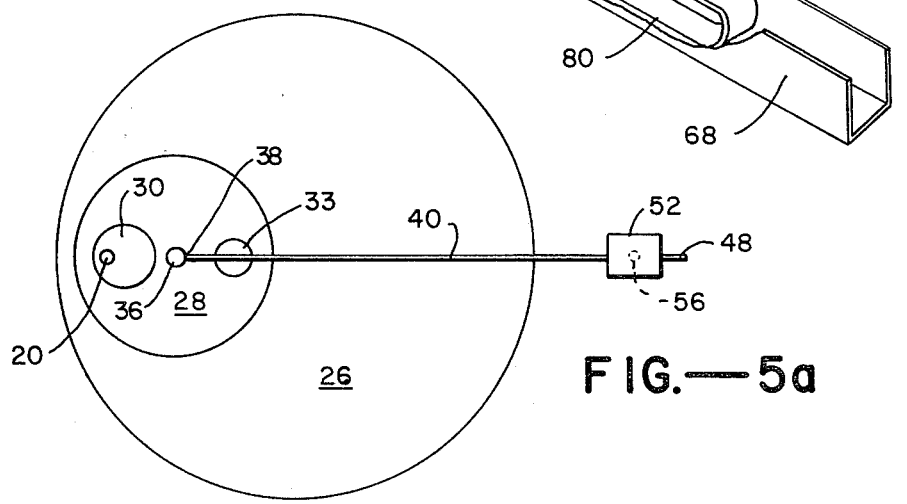
FIG.—5a

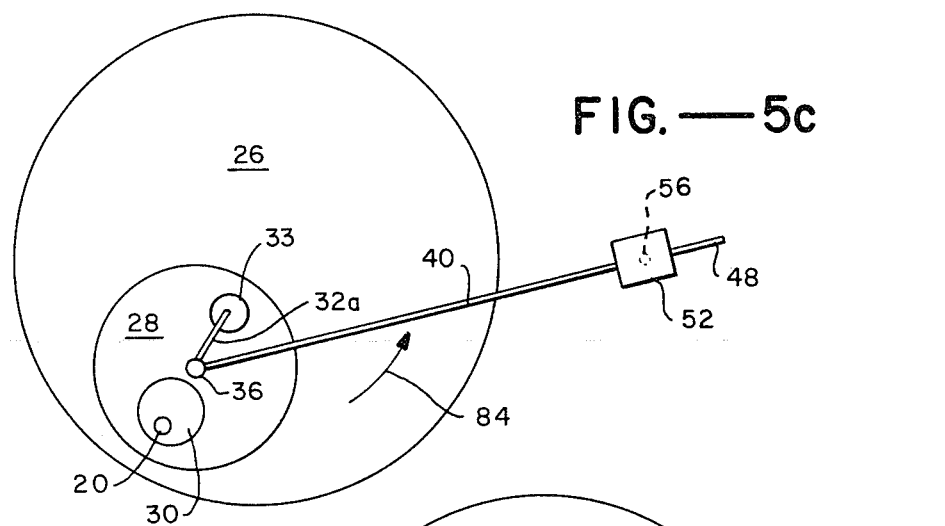
FIG.—5c
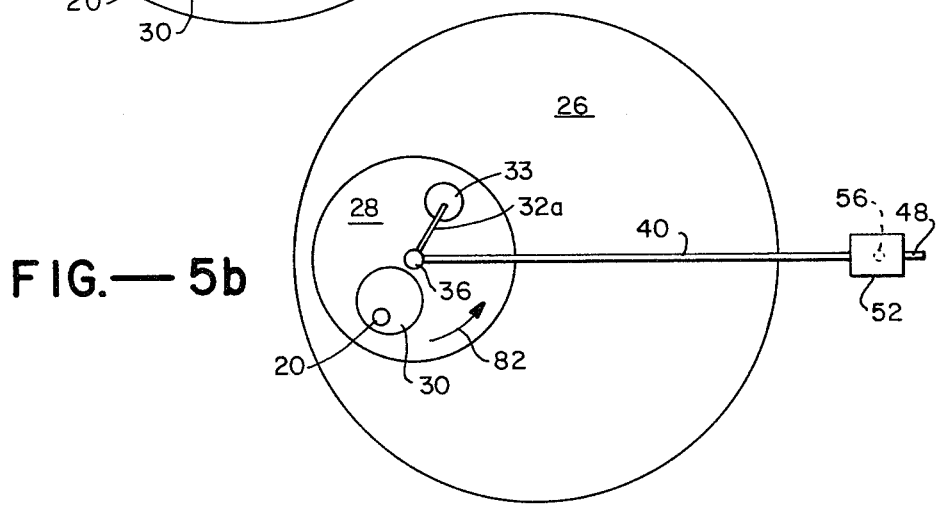
FIG.—5b
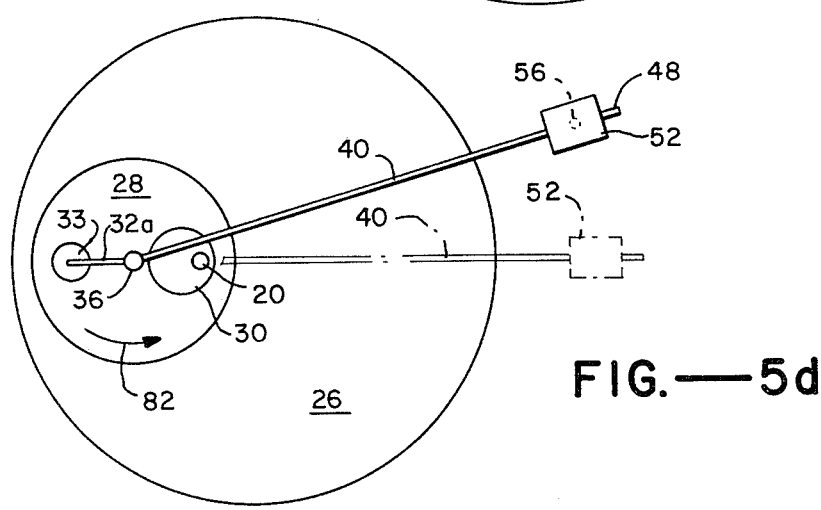
FIG.—5d

CABLE HANDLING SYSTEM FOR USE IN A NUCLEAR REACTOR

The present invention relates generally to cable handling systems and more particularly to a system for use in a specific type of nuclear reactor, for example one which utilizes an assembly of rotatable plugs such as a liquid metal fast breeder reactor (LMFBR).

A typical reactor of the type just recited has many operating components located within a sealed vessel. These components include an inner core, and, with respect to the present invention, an upper internal structure or instrument tree as it is also called and an internal fuel hoist for carrying fuel assemblies into and out of the core. The vessel itself includes an assembly of rotatably mounted, horizontal plugs serving to perform certain position related functions within the vessel including moving the hoist between various operating points therein. The reactor also requires power, instrumentation and service connections between an internal location within the vessel, specifically the instrument tree, and an external location, whereby to interconnect certain components within the vessel to certain remote, external components.

In an actual reactor of the type to which the present invention is especially suitable, specifically the LMFBR referred to above, the assembly of plugs, also referred to above, includes three horizontally extending, circular plugs mounted for rotation about their respective vertical axes. These plugs include an outermost plug which is the largest of the three, an intermediate plug mounted eccentrically within the outer plug and an inner plug mounted eccentrically within the intermediate plug. The internal fuel hoist is mounted to and extends down from the underside of the inner circular plug. In this way, by rotating the three plugs alone or in different combinations with one another, either clockwise or counterclockwise, the hoist can be moved both rectilinearly and/or curvilinearly between various points within the reactor vessel. However, at the same time it must be remembered that the reactor also includes power, instrumentation and service connections between components within the vessel, specifically the instrument tree and external components, as stated previously, and this has heretofore been greatly complicated by plug rotation.

A common way of alleviating the complication just recited has been to actually disconnect the various connections (actually electrical and/or tubular fluid carrying cables) between the internal and external components during rotation of the plugs. In order to do this in a reliable manner, it is absolutely necessary to make sure that all cables are completely connected or unconnected, whichever the case may be, and this is quite time consuming and hence costly. Accordingly, there have been proposals in the past to maintain the connections between the internal and external components during rotation of the plugs, thereby eliminating this latter time consuming and hence costly drawback. One proposal has been to use a cable support system that sits on the rotatable plugs and spans the annulus between adjacent plugs. This system uses commercially available hardware including a cable containing a rolling chain belt mechanism which rests on the plugs and spans the annulus between the plugs, thereby greatly congesting the area over the reactor vessel and complicating the rotating plug seal replacement.

As will be seen hereinafter, the present invention eliminates the time consuming and costly problem of connecting and disconnecting cables between internal and external reactor components by providing a cable handling system which allows the cables to remain connected during rotation of the various plugs. However, the cable handling system of the present invention is one which does not congest the area over the rotatable plugs or cause problems related to seal replacement. In addition, as will be seen hereinafter, this system is relatively uncomplicated in design, reliable in use, and, in a preferred embodiment, uses commercially available cable containing rotating belt equipment as part of the main support. Aero-trak by Aero-Motive Manufacturing Company and Powertrak by Gleason, division of Maysteel Corporation are two commercially available rolling belt devices useable in the present invention.

In view of the foregoing, one object of the present invention is to provide a cable handling system for use in a nuclear reactor of the general type described above and specifically a system which does not require disconnecting the otherwise connected internal and external components of the reactor during rotation of its plug assembly.

Another object of the present invention is to provide a cable handling system which does not greatly congest the area of the reactor directly above its plug assembly and which does not complicate seal replacement to any significant degree.

Still another object of the present invention is to provide a cable handling system which is relatively uncomplicated in design and reliable in use.

As will be seen hereinafter, the cable handling system disclosed herein includes a vertically extending drum tower fixedly mounted to and extending up from the topside of one of the rotating plugs, specifically from the center point on the previously recited intermediate plug in a preferred embodiment and carrying a cylindrical drum at its top. In this system, a first section of power, instrumentation and service cables (including electric and fluid cables) extend between certain components within the vessel, for example, the previously recited instrument tree, and a fixed terminal box at the base of the drum or tower. This section then passes up the tower to a fixed drum point at the top of the tower. A second section of the cables (and a section of the aforementioned rolling belt) is between the point on the drum and a remote, external point such that the distance between the two points varies, depending upon the way in which the plug and drum move. In this regard, the second cable section must be of sufficient configuration to compensate for this change in distance as the plugs rotate. Moreover, in order to compensate for plug rotation, the overall cable handling system includes cable support means (the rolling belt mechanism described) for supporting it for movement with the drum and for causing a segment to wrap around or unwrap from the drum, depending upon the way in which the latter and its supporting plug rotate.

As will be seen hereinafter, for the majority (normally about 5/6th) of the fuel handling operations within the reactor core, the remote end of the rolling belt mechanism stays in one location. Rotation and relative movement is compensated by rolling on and off the drum and/or by axial movement of the radial loop. For the remaining portion, (about 1/6th) of the operation within the core, the fuel hoist tower will hit the rolling belt mechanism unless the latter is moved. For these operations a carriage is provided to move tangentially to one side or another of a center line moving the mechanism with it to allow the fuel hoist to reach the center line from either side, i.e., as a result of clockwise or counter-clockwise rotation of the plugs.

FIG. 1 is a perspective view of a part of a nuclear reactor of the general type described previously, but one which includes a cable handling system designed in accordance with the present invention.

FIG. 2 is a perspective view of the cable handling system shown in one operating position, specifically the operating position shown in FIG. 1.

FIG. 3 is a perspective view similar to that of FIG. 2 but showing the cable handling system, actually only a portion thereof, in a second operating position.

FIG. 4 is a perspective view of a portion of the cable handling system in still another operating position.

FIGS. 5a–5d are diagrammatic illustrations, in plan view, of the way in which the cable handling system of FIG. 1 moves in response to movement of a rotatable plug assembly also comprising part of the reactor.

Turning now to the drawings, wherein like components are designated by like reference numerals throughout the various figures, attention is specifically directed to FIG. 1 which illustrates in part a liquid metal fast breeder reactor 10. This reactor is shown including a horizontally extending deck 12 directly above a vertically depending reactor vessel 14. The reactor includes a number of internal components, that is, components located within vessel 14. These components include a reactor core 16, an upper internal structure or instrument tree 18 which is located directly over the core in its normal operating position, a hoist arrangement 20 (extending inside and outside the vessel) and a fuel assembly track arrangement 22 for transporting fuel assemblies (not shown) into and out of the reactor core and vessel. These internal components as well as others not recited or shown are conventional and hence will not be described except as they affect the present invention.

As discussed previously, it is periodically necessary to move hoist 20 to various points within vessel 14 for performing certain functions including transferring fuel assemblies between core 16 and track arrangement 22. This is accomplished by means of a conventional plug assembly 24 located at the top of the vessel in deck 12 and shown exaggerated in size relative to many other components of the reactor. This assembly includes three horizontally extending, circular plugs, an outermost plug 26 which is the largest of the three, an intermediate plug 28 which is eccentrically located entirely within plug 26 and an innermost plug 30 which is eccentrically located entirely within plug 28. All three plugs are conventionally mounted for rotation about their respective axes (indicated by center-lines 1, 2 and 3) and the overall assembly includes conventional means (not shown) for rotating these plugs, either individually or in specific combinations for appropriately locating hoist 20.

Reactor 10 thus far described is conventional and includes other conventional components within vessel 14, as stated previously, and it also includes conventional components outside the vessel. In addition, the overall operation of reactor 10 requires power, instrumentation and service connections (both electrical and fluid carrying connections) between an internal location within the vessel and an external location to interconnect many of these internal components with many of the external components. This is best illustrated in FIG. 1 by the power, instrumentation and service cables which are generally indicated at 32 and which are to be operatively connected between instrument tree 28 (and other internal equipment) and an external location. As seen in FIG. 1, these cables pass out of vessel 14 through an eccentrically located opening 33 in intermediate plug 28. As will be seen hereinafter, reactor 10 includes a cable handling system 34 which is designed in accordance with the present invention and which is provided for connecting these latter cables to a predetermined external location through a series of cable sections, each of which may be made up of a group of different individual cable segments but which is continuous in length in a preferred embodiment.

As seen best in FIG. 1, system 34 includes a vertically extending, tower 35 fixedly mounted to and extending out from the topside of plug 28, along the centerline of the latter. In an actual embodiment the tower includes a terminal box (not shown) at the base and a large cylindrical drum 36 at the top. As also seen in this figure, the overall length of power, instrumentation and service cables 32 between the internal components of the reactor and its external components includes a first section 32a extending through eccentric passageway 33 and through the previously recited terminal box at the base of tower 35 to a fixed terminal point 38 on the circumference of drum 36. Terminal point 38 is actually at the fixed end of a cable mechanism 72 which is partially wrapped around drum 36 and which will be described hereinafter. In this way, no matter how the three plugs 26, 28 and 30 rotate, terminal point 38 will be fixed relative to passageway 33 and, hence, cable section 32a will be fixed relative to the terminal point and plug 28. In this way, it is relatively simple to handle this cable section between passageway 33 on plug 28 and terminal point 38 by either passing the cable section through the passageway as shown or by providing a separate cable subsection on the topside of the plug and a separate cable subsection on the bottomside with appropriate terminal connections therebetween. On the other hand, the way in which the remaining sections making up cables 32 are handled is slightly more complicated but made as simple as possible and also reliable by handling system 34, as will be seen below.

Turning specifically to FIG. 2 in conjunction with FIG. 1, attention is now directed to the remaining components making up the overall cable handling system. As seen in FIG. 2, this system also includes a horizontally extending, elongated rigid rail 40 defining an inner, channel 42 which extends along its underside and which opens downwardly. One end of this rail is connected to the top end of drum 36 by a pivot pin 44 or other such means which allows the drum to rotate freely about its own axis relative to the rail, as indicated by the arrow 46. The other end of rail 40 is free but includes an end section 48 which is supported in a particular way to be described below by a rail support arrangement 50.

Rail support arrangement 50 includes a slide support 52 having a through-hole 54 for slidably receiving end section 48 of rail 40. Slide support 52 is pivotally mounted to the top end of a vertically extending chain guide 56 which includes a vertically extending through-hole or opening 58 and which is provided for reasons to be described hereinafter. The chain guide is in turn fixedly monted to the topside of a carriage 60 which as will be seen hereinafter comprises part of an overall traversing mechanism 62. As will also be seen, this latter mechanism serves to move the rail support arrangement 50 between two extreme positions and an intermediate (resting) position for pivoting rail 40 between two extreme positions and an intermediate rest position. However, assuming for the moment that carriage 60 remains fixed in one of the extreme positions as shown in FIG. 2, it can be seen that arrangement 50 supports rail 40 for rectilinear movement back and forth in the directions of two way arrow 64 and for rotational movement about the axis of chain guide 56, as indicated by two-way arrow 66.

As stated above, traversing mechanism 62 includes carriage 60. This carriage is mounted on or within a suitable track 68 for movement between the extreme position shown in FIG. 2 and two positions one of which is the second extreme position shown in FIG. 4. The third position for the carriage is the resting position. The configuration of track 68 and the extreme positions for carriage 60 as shown in FIGS. 2 and 4 are selected to cause rail 40 to pivot about the axis of drum 36 between two predetermined, extreme positions, and the normal resting position for reasons to be discussed hereinafter. The carriage 60 may merely sit within a U-shaped track configuration as shown and move on appropriately provided wheels or other configurations may be provided such as longitudinally extending guide rails for the carriage to slide on. In any event, suitable means such as a carriage drive including wheels or a piston and cylinder arrangement shown generally at 70 may be provided for moving carriage 60 between its extreme positions.

In addition to the foregoing, overall system 34 includes an elongated chain mechanism 72 which may be identical to the Powertrak or Aero-trak mechanism recited previously for containing a second section 32b comprising part of overall cables 32 described previously. This latter cable section and one end of mechanism 72 are fixedly connected to and partially wrapped around drum 36 at point 38 and the cable section 32b is operatively connected with or a continuation of previously recited cable section 32a. When sections 32a and 32b are distinct sections, suitable interconnecting means would be provided. These latter means include conventional electrical terminals in the case of electrical cables and valves in the case of hollow tube cables. The otherwise free end of chain mechanism 72 and the otherwise free end of cable section 32b are located at what may be referred to as an external, remote terminal 74 located on the far side of carriage 60.

As seen in FIG. 2, chain mechanism 72 may be separated into two sections, a section 72a and a section 72b. Section 72a which is elongated cross-wise in the vertical direction passes through opening 58 in chain guide 56. Section 72b which is interconnected with section 72a by a suitable interconnecting member 72c is elongated cross-wise in the horizontal direction and is located on the backside of chain guide 56. For reasons to be discussed hereinafter, section 72a and its contained portion of cable section 32b is movable back and forth in a direction parallel with rail 40 and relative to the rail, as indicated by two-way arrow 76. This is accomplished by interconnecting section 72a to the rail by a number of spaced T-bars 78. As seen in FIG. 2, these T-bars extend up from and are fixed to chain section 72a by means of their stems and their cross-bars are slidably mounted within the previously described channel 42. Chain section 72b and its contained portion of cable section 32b bend around along the backside of guide 56 and carriage 60 and is free to flex back and forth with the rectilinear movement of chain section 72a.

Overall system 34 includes a second chain mechanism 80 which may be identical to either the chain section 72a or 72b. However, chain mechanism 80 serves to contain a third cable section 32c and has one end fixedly connected to the back of carriage 60. In this regard, suitable means are provided on the carriage for operatively connecting cable section 32c with cable section 32b when the two are distinct sections or more likely section 32c may be a continuation of section 32b. The other ends of cable mechanism 80 and cable section 32c extend to a second external, remote terminal point on the underside of tracks 68, as seen in FIG. 2. The various cables may take off from this latter point in the same direction as indicated by a fourth section 32d, as shown, or they may take off in different directions depending upon the locations of the external reactor components to which they ultimately connect with.

Having described cable handling assembly 34 from a structural standpoint, attention is now directed to the way in which it functions to contain cable section 32b and 32c regardless of the position of drum 36 and terminal point 38 on the drum, of course within a limited pattern of movement. In this regard, attention is directed to FIGS. 5a–d in conjunction with FIGS. 2–4. As seen first in FIG. 5a, the three plugs 26, 28 and 30 are positioned as shown in FIGS. 1 and 2, that is, with terminal point 38 somewhat rotated from side support 52 and chain guide 56 and with passageway 33 in line between the chain guide and drum 36. In these positions, it should be apparent that most of section 72a of chain mechanism 72 lies on the drum side of chain guide 56 and that only a portion of this chain section is wrapped around the drum. In this regard, it is desirable to maintain a sufficient portion of the chain section wrapped around the drum in this operational position so that the wrap is in one direction regardless of the operation of the overall system, that is whether or not the drum rotates clockwise or counter-clockwise. For example, in the embodiment shown, if the drum rotates clockwise (FIG. 2) the initial wrap will unwrap to some degree while counter-clockwise rotation of the drum increases the wrap around the latter. It should also be apparent that most of the rail 40 lies on the drum side of slide support 52. Also, the carriage 60 is in the position shown in FIG. 2. With this positional relationship as a starting point, the operation of system 34 will be described below.

Assume now that intermediate plug 28 rotates in the direction of arrow 82 as in FIG. 5b but that plug 26 remains stationary. In this case, rail 40 will remain stationary but drum 36 will rotate counter-clockwise causing an additional segment 72a' of chain section 72a to wrap around the drum in the manner shown in FIG. 3, along with a corresponding segment of the cable section 32b. This will cause the rest of section 72a and 72b and the rest of cable section 32b to move towards the drum along the underside of rail 40 as supported by T-bars 78. The excess motion is compensated by a reduction in the 72b trailing loop. As an alternative, assume now that intermediate plug 28 remains stationary and that plug 26 rotates in the direction of arrow 84 as shown in FIG. 5c. In this case, it should be apparent that the entire drum 36 actually moves closer to the rail support assembly 50 and at a different angle therewith. To compensate for this change, slide support 52 pivots at rail 40 and the latter slides further into the slide support, as seen in FIG. 5c. At the same time, it should also be apparent that terminal point 38 on drum 36 actually rotates around the axis or centerline of the larger plug 26 even though plug 28 remains stationary. As a result, a segment 72a' of chain mechanism 72 and its associated cable section segment will wrap around the drum, again in the counter-clockwise direction, as described previously. Obviously, the actual amount of cable which is wrapped around the drum may be different than the amount previously described. This motion is again compensated by the trailing loop 72b moving in or out. Rotation of the drum in the clockwise direction will of course cause some of the wrap 72a' to unwrap.

It should be obvious that the rotational situations just described could be provided simultaneously, that is, outermost plug 26 and intermediate plug 28 can rotate simultaneously in the same or opposite directions. In this case, the chain mechanism may or may not wrap around the drum 36 (over and above its original wrap) since it is possible that the rotation of plug 28 could be such as to cancel out the rotation of plug 26 from this standpoint. However, even under these circumstances, drum 36 would either move closer to or further from the rail support assembly and hence rail 40 and the chain mechanism 72 would move in the directions of arrows 64 and 76 (FIG. 2) either towards or away from the cable support assembly, depending upon the particular way in which the two plugs rotate.

As seen in FIG. 5d, there are situations where it is necessary to move previously described hoist 20 and hence inner plug 30 to a point where rail 40 and chain mechanism 72 have been located (FIGS. 5a–c). This is accomplished by rotating plug 28 about 180° counter-clockwise from its FIG. 5a position as indicated again by arrow 82, while maintaining the other two plugs stationary. In this case, it is necessary to move the rail and chain mechanism to a different location, specifically from the dotted line locations of FIG. 5d to the solid line locations shown therein. This is accomplished utilizing previously described traversing mechanism 62. More specifically, by moving carriage 60 from the position shown in FIG. 2 to the position shown in FIG. 4, the entire rail support assembly moves with it causing the rail and chain mechanism 72 to pivot about the axis of drum 36 from its dotted line position to its solid line position in FIG. 5d. In doing so, it should be apparent from FIGS. 2 and 4 that the chain mechanism 80 and cable section 32c move with the carriage. In this regard, it should be obvious that both this latter chain mechanism and cable section must be at least as long as the distance between the two extreme positions of the carriage. For fuel hoist operation in the clockwise direction, motion is reversed and the cable mechanism 72a tends to unwind from drum 36a and the carriage 60 moves in the opposite direction. Cable motion is still handled in the same way except that the trailing loop 72b tends to elongate to take up the now excess section 72a being unwrapped from drum 36.

From the foregoing, is should be apparent that system 34 is not limited to the exact reactor described, that is, LMFBR, but could be used to handle cables in the manner described where necessary but in different installations and environments. Moreover, the chain mechanism themselves are not limited to the particular ones recited so long as they function in the manner described, that is, to contain the cable sections and move and wrap to compensate for movement of drum 36.

What is claimed is:

1. In a nuclear reactor of the type having some operating components housed within a sealed vessel which includes an assembly of rotatably mounted, horizontal plugs serving to perform certain position related functions such as refueling within the vessel by rotating about predetermined vertical axes without opening said vessel to the ambient surroundings, said installation requiring power, instrumentation and service cable means extending between an internal location within the vessel and an external location whereby to interconnect certain ones of the components within the vessel to remote, external components, a system for providing said connections, even during rotation of said plugs during performance of said certain functions including refueling, said system comprising:
    means including a vertical drum mounted above the topside of one of said plugs for rotation therewith about at least one of said axes, a first section of said power, instrumentation and service cable means extending between said certain components within said vessel and a fixed terminal point on the circumference of said drum, said first section being movable with said one rotatable plug and said drum;
    a second section of said cable means extending between said fixed terminal point and a remote, external point such that the distance between said two points varies depending upon the way in which said one plug and drum rotate, said second cable means section being so configures to compensate for varying distances between said points; and
    cable support means for supporting said second cable means section for movement with said drum and for causing a segment of said second section to wrap around or unwrap from said drum, depending upon the way in which the latter and said one plug rotate.

2. A system according to claim 1 wherein said cable support means includes:
    an elongated support mechanism containing said second cable means section and including a segment which wraps around and unwraps from said drum with said cable means segment;
    an elongated, rigid rail having one end connected with the top of said drum such that the latter is free to rotate about its own axis and an opposite free end;
    means connecting said support mechanism to and for movement along said rail; and
    means for supporting said rail for movement with said drum as the latter moves about an axis of another plug.

3. A system according to claim 1 including:
    cable traversing means connected with said cable support means and including said remote point of connection, said traversing means being movable horizontally between first and second extreme positions for pivoting said second cable means section about said drum;
    means for moving said cable traversing means;
    a third section of said cable means extending between said remote point on said cable traversing means and a third point, said third section including at least a segment which is as long as the distance between said first and second extreme positions and which is movable with cable traversing means between said positions.

4. A system according to claim 3 wherein said cable support means includes:

an elongated support mechanism containing said second cable means section and including a segment which wraps around and unwraps from said drum with said cable means segment; an elongated, rigid rail having one end connected with the top of said drum such that the latter is free to rotate about its own axis and an opposite free end;

means connecting said support mechanism to and for movement along said rail; and means for supporting said rail for movement with said drum as the latter moves about an axis of another plug.

5. A system according to claim 4 wherein:

said one plug is located eccentrically within a larger plug, both of which are rotatable about their respective axes, whereby the combination of movement of said plugs causes said terminal point to move anywhere in a predetermined area with respect to said remote point; and said rail supporting means includes means for simultaneously slidably and pivotally carrying said rail so that its drum connected end can move with said drum.

6. A system according to claim 1 wherein said first and second cable means section together form a continuous section of said cable means.

7. A system according to claim 1 wherein said cable support means supports said second cable means section such that a segment of the latter is always wrapped around said drum during normal operation of the system regardless of the position of said drum.

8. A cable handling system for use in a nuclear reactor of the type having some operating components housed within a sealed vessel which includes an assembly of rotatably mounted, horizontal plugs serving to perform certain position related functions such as refueling within the vessel by rotating about predetermined vertical axes without opening said vessel to the ambient surroundings, said plugs including a smaller plug located eccentrically with a larger plug, both of which are rotatable about their respective axes, whereby the combination of movement of these latter plugs causes the center point on the smaller plug to rotate and move curvilinearly relating to a fixed reference point, said installation including power, instrumentation and service cable means extending between an internal location within the vessel to said remote reference point through said smaller plug, whereby to interconnect certain ones of the components within the vessel to remote, external components, said cable means including an external section extending between a terminal point directly above said center point and said reference point and being sufficiently long to compensate for movement of said plugs, said cable handling system comprising:

means including a vertically extending drum mounted above the topside of said smaller plug at said center point, and including said terminal point on its circumference, said drum supporting one end of said external cable section at said terminal point, the other end of said cable section being located at said remote reference point; and cable support means for supporting said external cable means section for movement with said drum and for causing a segment of said section to wrap around or unwrap from said drum, depending upon the way in which the latter and said smaller plug rotate relative to said reference point, said cable support means including an elongated, flexible chain mechanism which contains said cable section and which includes a chain segment which wraps around and unwraps from said drum with said cable means segment, an elongated rigid rail having one end connected with the top end of said drum such that the latter is free to rotate about its own axes and an opposite free end, means connecting said chain mechanism to and for movement along said rail as said cable section segment is wrapped or unwrapped around said drum, and means for supporting said rail for movement with said drum as the latter moves around the axis of said larger plug, said rail supporting means including means for simultaneously slidably and pivotally carrying said rail; whereby said plugs can be rotated in predetermined ways to perform said certain functions including refueling without opening said vessel to the ambient surroundings and without disconnecting said cable means between said internal location and said remote reference point.

9. A system according to claim 8 including:

cable traversing means connected with said cable support means and including said remote reference point, said traversing means being movable horizontally between first and second extreme positions for pivoting said external cable means sections and rail about said drum;

means for moving said cable traversing means; and wherein a second section of said cable means extends between said remote reference point on said cable traversing means and a second external reference point, said second section including at least a segment which is as long as the distance between said first and second positions and which is movable with the cable traversing means between said positions.

* * * * *